United States Patent [19]

Sano

[11] Patent Number: 5,323,283
[45] Date of Patent: Jun. 21, 1994

[54] FLOATING MAGNETIC HEAD SLIDER

[75] Inventor: Akinobu Sano, Shizuoka, Japan

[73] Assignee: Minebea Co., Ltd., Nagano, Japan

[21] Appl. No.: 135,432

[22] Filed: Oct. 12, 1993

Related U.S. Application Data

[63] Continuation of Ser. No. 827,354, Jan. 29, 1992, abandoned.

[30] Foreign Application Priority Data

Mar. 29, 1991 [JP] Japan .................. 3-91764

[51] Int. Cl.$^5$ .............................. G11B 5/187
[52] U.S. Cl. .............................. 360/103
[58] Field of Search ............... 360/103, 102, 104

[56] References Cited

U.S. PATENT DOCUMENTS 4,805,059 2/1989 Tsuchiya et al. ............ 360/125
4,814,915 3/1989 Wada et al. ............ 360/103
4,835,640 5/1989 Endo et al. ............ 360/103
5,079,657 1/1992 Aronoff ............ 360/103
5,168,407 12/1992 Shimizu et al. ............ 360/103
5,175,658 12/1992 Chang et al. ............ 360/103

FOREIGN PATENT DOCUMENTS 62-234223 10/1987 Japan ............ 360/103
63-208208 8/1988 Japan ............ 360/103

Primary Examiner—John H. Wolff
Attorney, Agent, or Firm—Oliff & Berridge

[57] ABSTRACT

There is disclosed a wearproof floating magnetic head slider adapted for a lap top computer. The magnetic head utilizes the contact/start & stop system. A protective film of a high hardness is formed at least on parts of the sliding surface of the slider. The protective film is made of $SiO_2$, $ZrO_2$-$Y_2O_3$, or $MgO$-$SiO_2$.

2 Claims, 2 Drawing Sheets

CSS Test Conditions

Number of CSS Tests

FLOATING MAGNETIC HEAD SLIDER

This is a continuation of application Ser. No. 07/827,354 filed Jan. 29, 1992, now abandoned.

BACKGROUND OF THE INVENTION

1. Field of the Invention

The present invention relates to a floating magnetic head slider which shows improved wear resistance without adversely affecting the characteristics of the magnetic head and which is prevented from sticking.

2. Description of the Prior Art

Presently, the contact/start and stop (CSS) system is often used in the floating magnetic heads of hard disk drives, because the CSS system makes the structure simple and reduces the cost. In this CSS system, when a disk is rotating at a high speed, the magnetic head is made to float about 0.1 to 0.3 $\mu$m off the surface of the disk. When the rotation of the disk is brought to a stop, the sliding surface of the head is pressed against the surface of the disk. This stationary condition is then maintained. Therefore, when the disk is started and stopped, large frictional forces are produced between the disk and the magnetic head. It is normally desired that the coefficient of friction occurring at this time be set less than 1.

One conventional countermeasure taken to avoid the wear between the magnetic head and the disk surface is to form a very hard film made of $SiO_2$ or graphite oil the surface of the magnetic disk. Another prevailing countermeasure is to form a lubricating film on the surface of the magnetic disk. The present situation is that almost no countermeasure is taken to protect the magnetic head against wear.

Japanese Patent Laid-open No. 61163/1986 discloses a magnetic head slider having a protective film of carbon on its surface, for protecting the slider against wear. Japanese Patent Publication No. 276074/1990 discloses a magnetic head slider whose surface is made uneven to reduce the coefficient of friction.

In the above-described prior art techniques, the hardness of a magnetic head whose wear resistance is not improved is lower than that of a disk having improved wear resistance. Where they differ greatly in hardness in this way, the magnetic head of a lower hardness is worn away by the surface of the disk, thus producing particles. This increases the coefficient of friction t, which in turn increases the possibility of a head crash. Where the surface is made uneven to reduce the area of frictional contact, if the disk surface and the uneven surface differ greatly in hardness, then problems take place in the same way as in the case of the use of a hard film of graphite described above.

The sliding surface of a slider using a ferrite or calcium has the following problems. In recent years, the recording densities of magnetic heads have tended to be increased. With this trend, heads are made to float a less distance above the disk. Also, disks on which metals are sputtered have been increasingly adopted. In this way, the wear resistances of the sliding surfaces of sliders have been required to be improved further. Experiments were made on sliders made of ferrite as well as on sliders made of calcium. It was confirmed that when the number of CSS tests reached several thousands to tens of thousands, the coefficient of friction exceeded 1, scratching the disk surfaces. Also, head crashes occurred. In this manner, these drives are not satisfactorily reliable.

One contemplated countermeasure taken to reduce the coefficient of friction between the sliding surface of the slider and the disk is to make both surfaces specular. Where the contact/start and stop system is adopted, the magnetic head is pressed against the surface of the disk when the disk stops. If the head is kept at rest for a long time, they are stuck on each other. This phenomenon is known as sticking. Also, when the drive is set into operation, the flexure that holds the magnetic head is deformed or the disk surface is scratched.

A so-called head-loading mechanism is presently available to prevent the aforementioned sticking, in which, when the drive is stopped, the magnetic head is raised from the disk. Unfortunately, this mechanism is complex in structure and expensive to fabricate. Recently, hard disk drives of smaller diameters have been installed in lap top computers. In this case, there is a possibility that magnetic heads are used under severer mechanical environments than conventional desktop computers. Moreover, the number of CSSes tends to be increased because of the adoption of so-called sleep mode, wherein, when data is not accessed, the rotation of the disk is stopped to save the electric power consumed.

SUMMARY OF THE INVENTION

It is an object of the present invention to provide a floating magnetic head slider which has sufficient wear resistance to be used under severe conditions such as those lap top computers experience and which prevents sticking if the CSS system is adopted.

The above object is achieved by a floating magnetic head slider which utilizes the contact/start and stop (CSS) system and has a hard protective film formed on the sliding surface of the head slider, the protecting film consisting of $SiO_2$, $ZrO_2$-$Y_2O_3$, or $MgO$-$SiO_2$.

In accordance with the present invention, it was confirmed by CCS experiments that the slider of a floating magnetic head is excellent in wear resistance, is little affected due to the film thickness in the floating amount of the head above the disk, is excellent in the electromagnetic conversion characteristics of the magnetic head and is free from sticking.

Other objects and features of the present invention will appear in the course of the description thereof which follows.

PREFERRED EMBODIMENT OF THE PRESENT INVENTION

Figure 1:
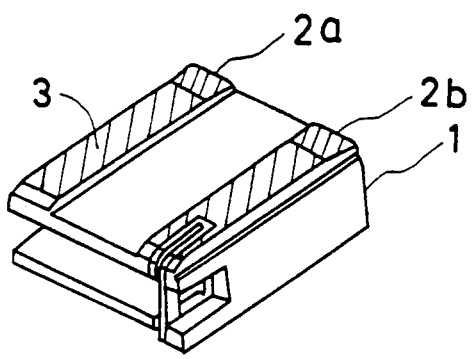
FIG. 1 is a perspective view of a composite-type magnetic head on which a protective film according to the invention is formed.
Figure 2:
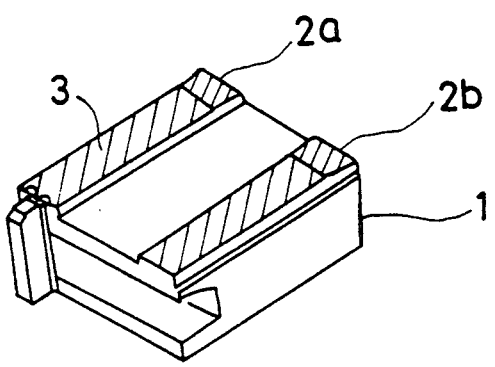
FIG. 2 is a perspective view of a magnetic head of the MTC type.
Figure 3:
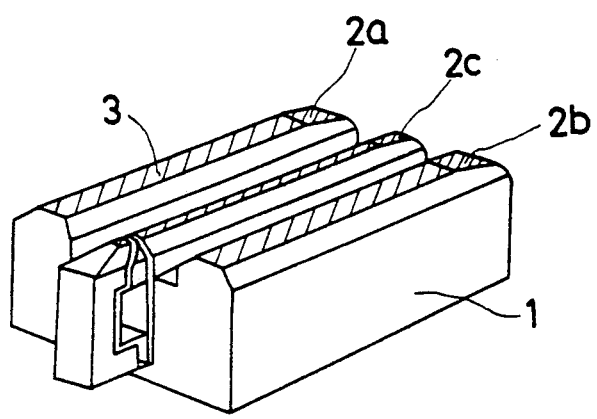
FIG. 3 is perspective view of a magnetic head of the monolithic type.

Referring to FIGS. 1-3, there are shown three kinds of magnetic heads on which protective films according to the present invention are formed. In each figure, the magnetic head, generally indicated by reference numeral 1, has sliding surfaces 2a, 2b, and 2c indicated by hatching. A protective film 3 is formed on each sliding surface by known vacuum deposition techniques. The film is made of a material of high purity selected from the group consisting of $SiO_2$, $ZrO_2$-$Y_2O_3$, and $MgO$-$SiO_2$. The surface roughness of the produced film lies within the range from 100 to 500 Å.

Figure 4:
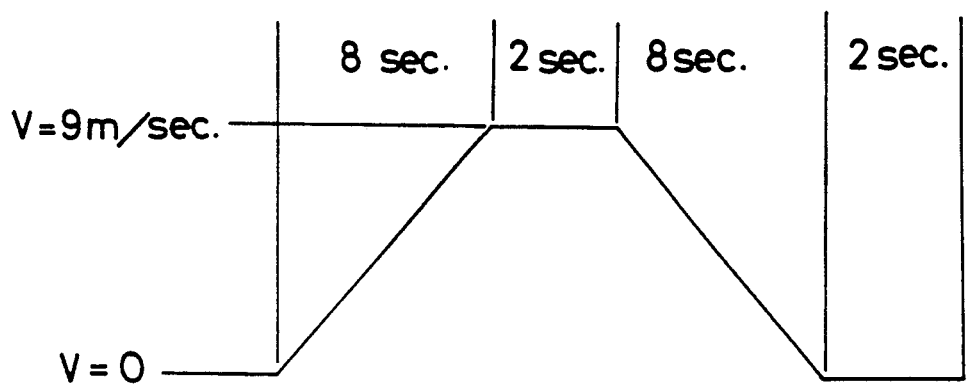
FIG. 4 is a diagram illustrating CSS conditions under which experiments were carried out to confirm the effects of the invention.

Experiments were carried out to demonstrate the effects of the magnetic heads according to the invention. Films of $SiO_2$ were formed on the heads. Three kinds of thickness of these films were 0, 230 Å, and 450 Å, respectively. The aforementioned CSS conditions are illustrated in FIG. 4. That is, the load applied to each head was 6.5 g. The speed of the head relative to the disk was 9 m/sec. The disk was accelerated for 8 seconds. The disk was rotated at its normal constant speed for 2 seconds. The disk was decelerated for 8 seconds. The disk was held at rest for 2 seconds.

Figure 5:
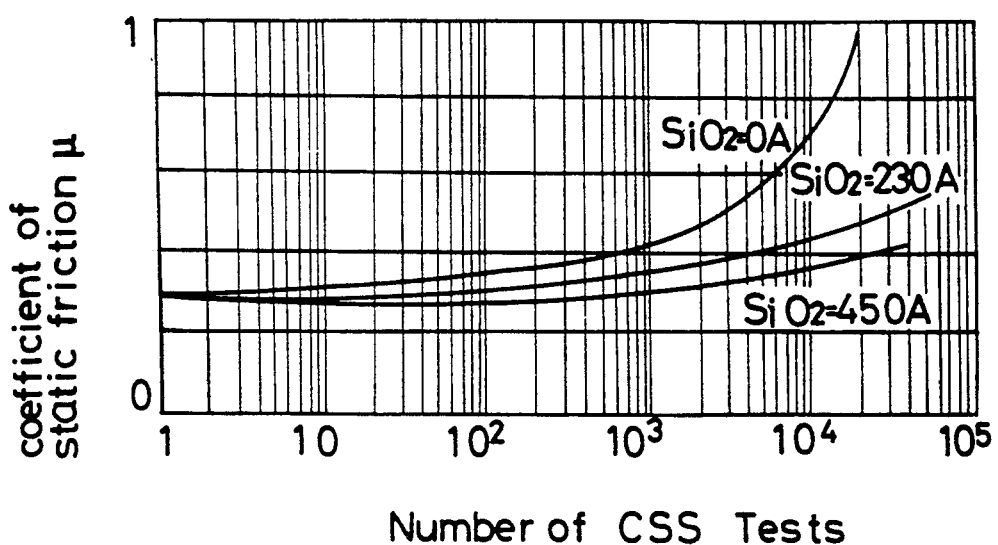
FIG. 5 is a table of logarithms showing the results of the experiments.

The results of the experiments are shown in FIG. 5. The effect of the coefficient of static friction on the number of CSS tests is shown in FIG. 5 for each thickness of protective film. As can be seen from this figure, the coefficient of static friction increases at a lower rate with the number of CSS tests as the thickness of the film is increased. This demonstrates that $SiO_2$ shows a good wear resistance against CSS tests. Also, it can be said that the wear resistance was improved with increasing the thickness of the film.

Then, the effective amounts of floating of the heads, the 2F output characteristics, and the overwrite characteristics were measured. The results are shown in the following table.

TABLE

| $SiO_2$ film thickness | effective amount of floating of head | 2F output | overwrite |
|---|---|---|---|
| 0Å | 0.19 μm | 386 μV | 31.8 dB |
| 225Å | 0.21 μm (estimated) | 374 μV | 30.0 dB |

The results of the experiments indicated above compare the film of $SiO_2$ having zero thickness with the film of $SiO_2$ leaving a thickness of 225 Å. With respect to the amounts of floating of the heads, the effective amount of floating of the head having the film is greater than that of the head without a film by an amount equal to the thickness of the film. The effective amount of floating means the distance between the surface of the disk and the surface of the base of the slider. This amount actually affects the electromagnetic conversion characteristics. With respect to the electromagnetic conversion characteristics of the magnetic heads, we observed that the head having the film was slightly deteriorated in output and overwrite characteristics. However, such slight deteriorations do not hinder practical usage. The overwrite characteristics mean writing new data in a location while destroying the data previously contained there.

Experiments on stiction were carried out. The results of the experiments are shown in FIG. 5. Two magnetic heads were prepared. One head had a $SiO_2$ film 230 Å thick. The other head had a $SiO_2$ film 450 Å thick. Each head was allowed to stand on a disk for 24 hours. The coefficient of friction when the rotation was started as illustrated in FIG. 4 was measured before and after the head was allowed to stand as described above. The coefficient of friction showed almost no difference before and after this. This means that the unevenness of the sliding surface of the slider was maintained through the $SiO_2$ film of the above-described thickness was formed, and that $SiO_2$ is effective in preventing sticking.

The magnetic heads were actually observed during the experiments the results of which are shown in FIG. 5. With respect to the magnetic head without a $SiO_2$ film, the coefficient of friction exceeded 1 when the number of CSS tests reached 20,000. We noticed that scratches were produced on the surfaces of the disk and of the slider. With respect to the head having the film of a thickness of 230 Å, the coefficient of friction was 0.25 when the number of CSS tests reached 20,000. With respect to the head having the film of a thickness of 450 Å, the coefficient of friction was less than 0.2. Regarding these two heads, no scratches were observed on the disk or on the slider. Similar favorable results were obtained from the films made of $ZrO_2$-$Y_2O_3$ and $MgO$-$SiO_2$, respectively.

We now summarize the results of the experiments. Where a film is made of $SiO_2$, the formation of the film is stable. In addition, the film is excellent in wear resistance. This head which is excellent in wear resistance and prevents sticking is appropriate as a wearproof protective film for a floating magnetic head slider incorporated in a lap top computer that is used under severe conditions. The film thickness affects the amount of floating of the magnetic head, hence the electromagnetic conversion characteristics. Therefore, a suitable film thickness is required.

Specifically, it is desired to reduce the film thickness in order that the magnetic head float by a smaller amount and that the writing and reading characteristics be improved, as can be seen from the Table. On the other hand, as can be seen from FIG. 5, the film thickness should be increased to improve the wear resistance. A compromise is struck between these conflicting requirements. Experiments have revealed that the upper limit of appropriate film thicknesses is 200 Å plus 25 Å and that the lower limit is 200 Å minus 25 Å.

In the above description, the films are made of $SiO_2$. We performed similar experiments on $ZrO_2$-$Y_2O_3$ and $MgO$-$SiO_2$ and obtained similar results. In the present example, the hard protective film 3 is formed over the whole sliding surface as shown in FIGS. 1-3. Experiments have shown that similar results arise where a hard protective film is formed on parts of the sliding surface. Fabricating the gap in the magnetic head out of the same material can reduce the cost of production of the magnetic head.

As described in detail thus far, in accordance with the present invention, a hard protective film made of $SiO_2$, $ZrO_2$-$Y_2O_3$, or $MgO$-$SiO_2$ is formed on the sliding surface of the slider of a floating magnetic head. Hence, a floating magnetic head slider which is excellent in wear resistance and prevents stiction can be derived. This can be used as a floating magnetic field slider for a lap top computer.

What is claimed is:

1. A floating magnetic head slider of the contact/start and stop system for floating relative to a surface of a moving medium and contacting the surface of the medium when the medium is stationary, said slider having a sliding surface on which a protective film of a high hardness is formed, the protective film being made of a material selected from the group consisting of $SiO_2$, $ZrO_2$-$Y_2O_3$, and $MgO$-$SiO_2$ and having a thickness in a range of 175 Å to 225 Å, the range of thickness being based on a desired floating distance between the surface of the moving medium and the slider, prevention of stiction between the slider and the surface of the stationary medium, and wear resistance of the slider.

2. The floating magnetic head slider of claim 1, wherein said protective film is formed on parts of the sliding surface.

* * * * *